(12) United States Patent
Acharya et al.

(10) Patent No.: US 11,983,391 B2
(45) Date of Patent: May 14, 2024

(54) SYSTEM AND METHOD FOR DATA ANALYSIS AND PROCESSING USING IDENTIFICATION TAGGING OF INFORMATION ON A GRAPHICAL USER INTERFACE

(71) Applicant: BANK OF AMERICA CORPORATION, Charlotte, NC (US)

(72) Inventors: Rajneesh Acharya, Princeton Junction, NJ (US); Vikash Agarwal, Plainsboro, NJ (US); Rahul Tandon, Monroe Township, NJ (US); Suresh Solomon, Marlboro, NJ (US); Mark Labbancz, Robbinsville, NJ (US); Ganesh Agrawal, Plainsboro, NJ (US); Laura A. Bertarelli Hamilton, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/896,609

(22) Filed: Aug. 26, 2022

(65) Prior Publication Data
US 2024/0069698 A1 Feb. 29, 2024

(51) Int. Cl.
*G06F 3/0484* (2022.01)
*G06F 40/117* (2020.01)
*G06F 40/18* (2020.01)

(52) U.S. Cl.
CPC .......... *G06F 3/0484* (2013.01); *G06F 40/117* (2020.01); *G06F 40/18* (2020.01)

(58) Field of Classification Search
CPC .... G06F 40/18; G06F 3/0482; G06F 3/04842; G06F 16/24564; G06F 2200/1614; G06F 3/017; G06F 3/04845; G06F 3/0485; G06F 3/04895; G06F 40/174; G06F 40/177; G06F 2200/1637; G06F 2203/04803; G06F 3/03547; G06F 3/0481; G06F 3/04886;
(Continued)

(56) References Cited

U.S. PATENT DOCUMENTS 7,668,821 B1 2/2010 Donsbach
7,685,198 B2 3/2010 Xu
(Continued)

*Primary Examiner* — Rayeez R Chowdhury
(74) *Attorney, Agent, or Firm* — Moore & Van Allen PLLC; Lauren M. Stokes

(57) ABSTRACT

Systems, computer program products, and methods are described herein for providing data analysis and processing using identification tagging of information on a graphical user interface. The method includes identifying a data point within a data rendering to a graphical user interface. The method also includes generating a point identification indicator for the given data point within the data rendering to the graphical user interface. The method includes receiving a user input associated with the data point within the data rendering to the graphical user interface. The user input includes a user commentary associated with the data associated with the data point within the data rendering to the graphical user interface. The method further includes associating the user input with the data point using the point identification indicator. The user input is associated with the data point within the data rendering to the graphical user interface via the point identification indicator.

20 Claims, 6 Drawing Sheets

(58) Field of Classification Search
CPC ......... G06F 40/134; G06F 2203/04806; G06F 2203/04808; G06F 3/0346; G06F 3/04817; G06F 3/0486; G06F 3/0488; G06F 3/04883; G06F 40/169; G06F 11/30; G06F 11/3006; G06F 11/3058; G06F 11/3062; G06F 3/04847; G06F 16/9537; G06F 1/3287; G06F 11/3051; G06F 11/32; G06F 16/29; G06F 40/30; G06F 16/951; G06F 16/9535; G06F 16/9538; G06F 2209/5017; G06F 40/166; G06F 9/4806; G06F 9/4843; G06F 9/5027; G06F 9/5072; G06F 40/186; G06F 11/0766; G06F 11/3072
See application file for complete search history.

(56) References Cited

U.S. PATENT DOCUMENTS

| | | | |
|---|---|---|---|
| 7,756,799 B2 | 7/2010 | Kirshenbaum | |
| 7,805,431 B2 | 9/2010 | Siegel | |
| 7,930,197 B2 | 4/2011 | Ozzie | |
| 8,108,260 B2 | 1/2012 | Maguire | |
| 8,275,666 B2 | 9/2012 | Chang | |
| 8,543,625 B2 | 9/2013 | Middleton | |
| 10,282,405 B1* | 5/2019 | Silk | G06F 40/18 |
| 10,445,062 B2 | 10/2019 | Oberbreckling | |
| 10,628,456 B2 | 4/2020 | Beznos | |
| 11,119,980 B2 | 9/2021 | Szczepanik | |
| 11,372,830 B2 | 6/2022 | Raza | |
| 2002/0159641 A1 | 10/2002 | Whitney | |
| 2005/0065958 A1* | 3/2005 | Dettinger | G06F 16/24573 707/999.102 |
| 2005/0256703 A1* | 11/2005 | Markel | G06Q 40/06 704/223 |
| 2007/0162546 A1* | 7/2007 | McLaughlin | G06F 16/48 709/204 |
| 2008/0103849 A1 | 5/2008 | Forman | |
| 2018/0123995 A1* | 5/2018 | Xue | G06F 16/248 |
| 2019/0205453 A1* | 7/2019 | Miller | G06F 16/245 |
| 2021/0098133 A1 | 4/2021 | Chowdhry | |
| 2022/0318221 A1 | 10/2022 | He | |
| 2022/0334773 A1* | 10/2022 | Porzio | G06F 3/0673 |
| 2022/0350575 A1 | 11/2022 | Ryan | |

\* cited by examiner

SYSTEM AND METHOD FOR DATA ANALYSIS AND PROCESSING USING IDENTIFICATION TAGGING OF INFORMATION ON A GRAPHICAL USER INTERFACE

FIELD OF THE INVENTION

Example embodiments of the present disclosure relate generally to data analysis and processing and, more particularly, to data analysis and processing using identification tagging of information on a graphical user interface.

BACKGROUND

Current analytical programs struggle to handle high volumes of data with efficiency and also lack the ability to process the large volume of data in real-time. Additionally, the current analytical programs struggle to combine data from different sources effectively. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for providing data analysis and processing using identification tagging of information on a graphical user interface is provided. The system includes at least one non-transitory storage device and at least one processing device coupled to the at least one non-transitory storage device. The at least one processing device is configured to identify a data point within a data rendering to a graphical user interface. The at least one processing device is also configured to generate a point identification indicator for the given data point within the data rendering to the graphical user interface. The at least one processing device is further configured to receive a user input associated with the data point within the data rendering to the graphical user interface. The user input includes a user commentary associated with the data associated with the data point within the data rendering to the graphical user interface. The at least one processing device is still further configured to associate the user input with the data point using the point identification indicator. The user input is associated with the data point within the data rendering to the graphical user interface via the point identification indicator.

In various embodiments, the at least one processing device is configured to cause a rendering of the user input associated with the data point within the data rendering to the graphical user interface. In various embodiments, the user commentary relating to the data point is a textual input.

In various embodiments, the data point is used in various portions of the graphical user interface and the user input is associated with the data point in each of the various portions of the graphical user interface. In various embodiments, the various portions of the graphical user interface include a first graphical section and a first spreadsheet section. In such an instance, the user input is associated with the data point on each of the first graphical section and the first spreadsheet section.

In various embodiments, the data point within the data rendering to the graphical user interface is associated with a data packet from a data source. In various embodiments, the data point within the data rendering to the graphical user interface is associated with at least two data packets from a plurality of data sources.

In another example embodiment, a computer program product for providing data analysis and processing using identification tagging of information on a graphical user interface is provided. The computer program product includes at least one non-transitory computer-readable medium having computer-readable program code portions embodied therein. The computer-readable program code portions include an executable portion configured to identify a data point within a data rendering to a graphical user interface. The computer-readable program code portions also include an executable portion configured to generate a point identification indicator for the given data point within the data rendering to the graphical user interface. The computer-readable program code portions further include an executable portion configured to receive a user input associated with the data point within the data rendering to the graphical user interface. The user input includes a user commentary associated with the data associated with the data point within the data rendering to the graphical user interface. The computer-readable program code portions still further include an executable portion configured to associate the user input with the data point using the point identification indicator. The user input is associated with the data point within the data rendering to the graphical user interface via the point identification indicator.

In various embodiments, the computer program product further includes an executable portion configured to cause a rendering of the user input associated with the data point within the data rendering to the graphical user interface. In various embodiments, the user commentary relating to the data point is a textual input.

In various embodiments, the data point is used in various portions of the graphical user interface and the user input is associated with the data point in each of the various portions of the graphical user interface. In various embodiments, the various portions of the graphical user interface include a first graphical section and a first spreadsheet section. In such an instance, the user input is associated with the data point on each of the first graphical section and the first spreadsheet section.

In various embodiments, the data point within the data rendering to the graphical user interface is associated with a data packet from a data source. In various embodiments, the data point within the data rendering to the graphical user interface is associated with at least two data packets from a plurality of data sources.

In still another example embodiment, a computer-implemented method for providing data analysis and processing using identification tagging of information on a graphical user interface is provided. The method includes identifying a data point within a data rendering to a graphical user interface. The method also includes generating a point identification indicator for the given data point within the data rendering to the graphical user interface. The method further includes receiving a user input associated with the data point within the data rendering to the graphical user interface. The user input includes a user commentary associated with the data associated with the data point within the data rendering to the graphical user interface. The method still further includes associating the user input with the data point using the point identification indicator. The user input is associated with the data point within the data rendering to the graphical user interface via the point identification indicator.

In various embodiment, the method includes causing a rendering of the user input associated with the data point within the data rendering to the graphical user interface. In various embodiment, the data point is used in various portions of the graphical user interface and the user input is associated with the data point in each of the various portions of the graphical user interface. In various embodiment, the various portions of the graphical user interface include a first graphical section and a first spreadsheet section. In such an embodiment, the user input is associated with the data point on each of the first graphical section and the first spreadsheet section.

In various embodiment, the data point within the data rendering to the graphical user interface is associated with a data packet from a data source. In various embodiment, the data point within the data rendering to the graphical user interface is associated with at least two data packets from a plurality of data sources.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION OF EMBODIMENTS OF THE INVENTION

Figure 1A:
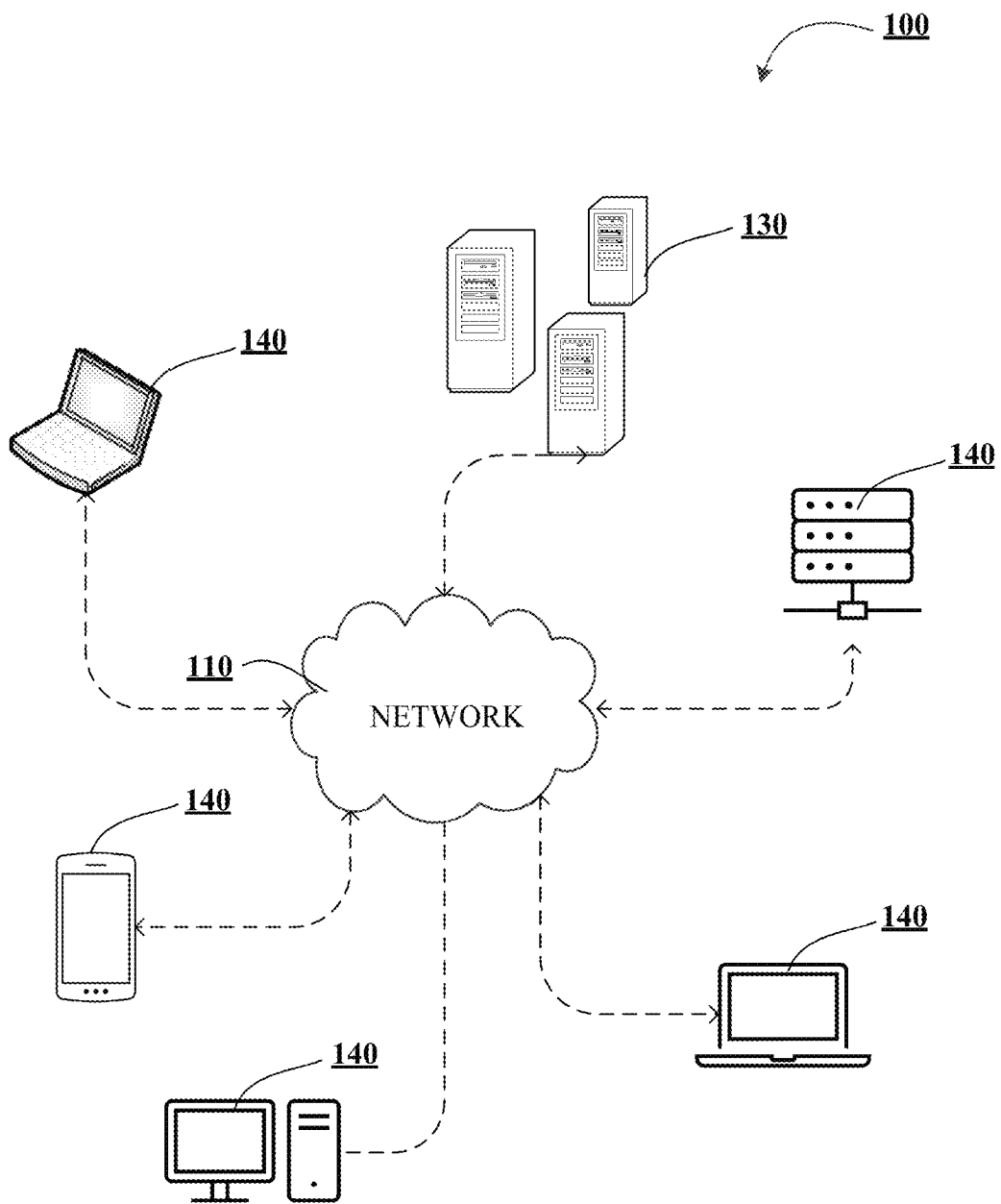
FIGS. 1A-1C illustrates technical components of an exemplary distributed computing environment for providing data analysis and processing using identification tagging of information on a graphical user interface.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The system provides a single reporting and analytics platform. The system connects to different data sources to extract the data and load it into the system memory to create attributes for reporting and analytics. The system creates a real-time integration of internal data sources for generation of reports and analytics. The platform uses rows, columns, measures (numerical value), and filters to make up a data grid based on the data packets received. Within the data grid, a data point can be identified, which is assigned a point identification indicator. The platform allows users to take large amounts of data packet from different sources into attributes that can be manipulated into row or column dimension. The platform has a report builder and worksheet builder to create published reports.

Various embodiments of the present disclosure provide for providing data analysis and processing using identification tagging of information on a graphical user interface. The system is configured to identify a data point within a data rendering to a graphical user interface. A point identification indicator is generated for the given data point within the data rendering. The system is configured to receive a user input associated with the data point. The user input is then associated with the data point using the point identification indicator. As such, the data point can be rendered with the user input across different representation styles (e.g., graphical, textual, spreadsheet, and/or the like).

The present disclosure provides a technical solution to a technical problem. As described herein, the technical problem includes optimizing processing capabilities by leveraging individual components or sets of components to analyze and process data more effectively. Benefits of the present disclosure include reduced build costs as platform reusable library can be used to execute a multitude of tasks; greater consistency of data locating, data catalog, aggregation, reporting and documentation; improved transparency into key drivers and details behind results including inputs, outputs, and variances; and/or increased responsiveness to changing processing demand.

Figure 1B:
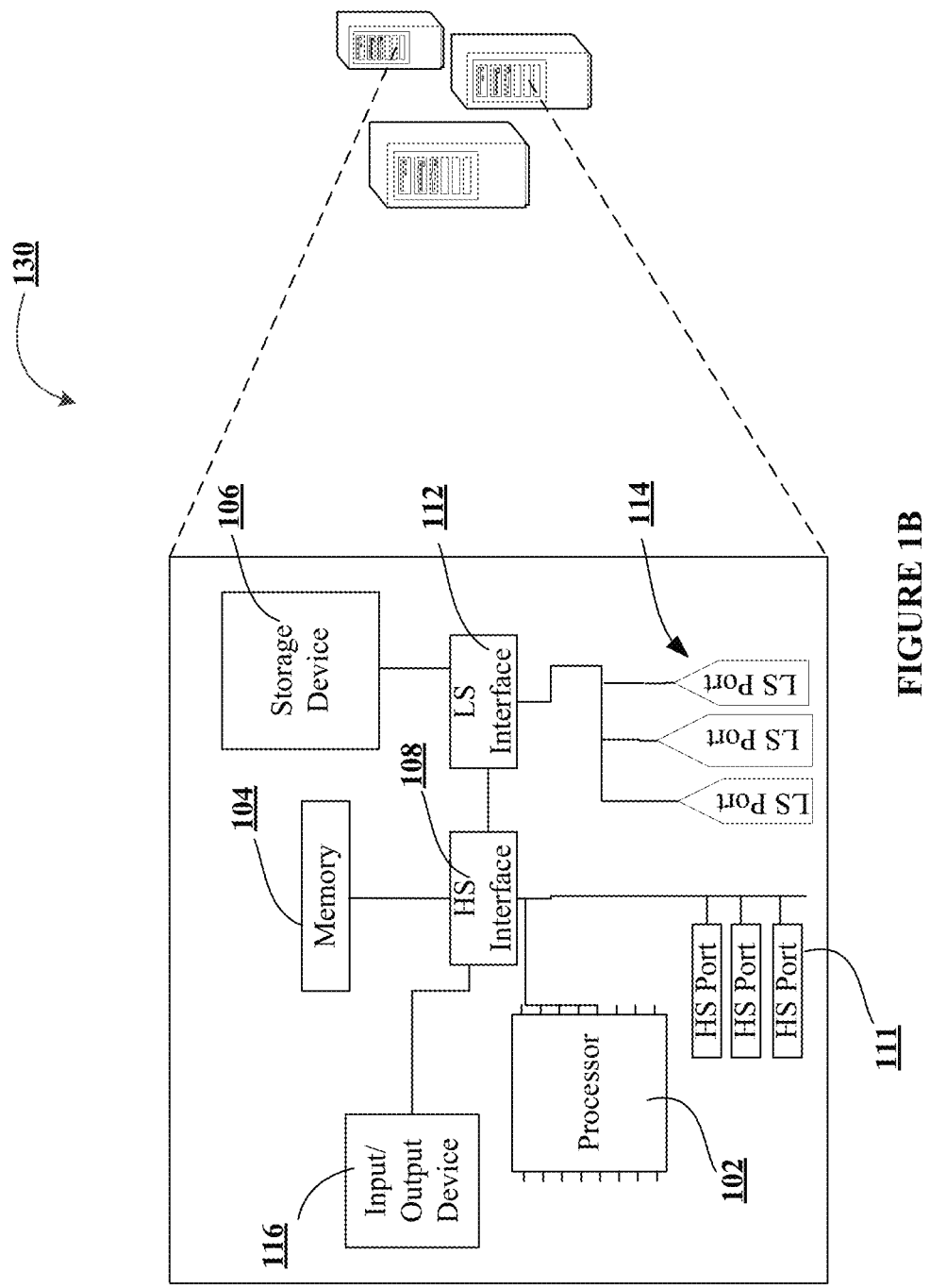
Figure 1C:
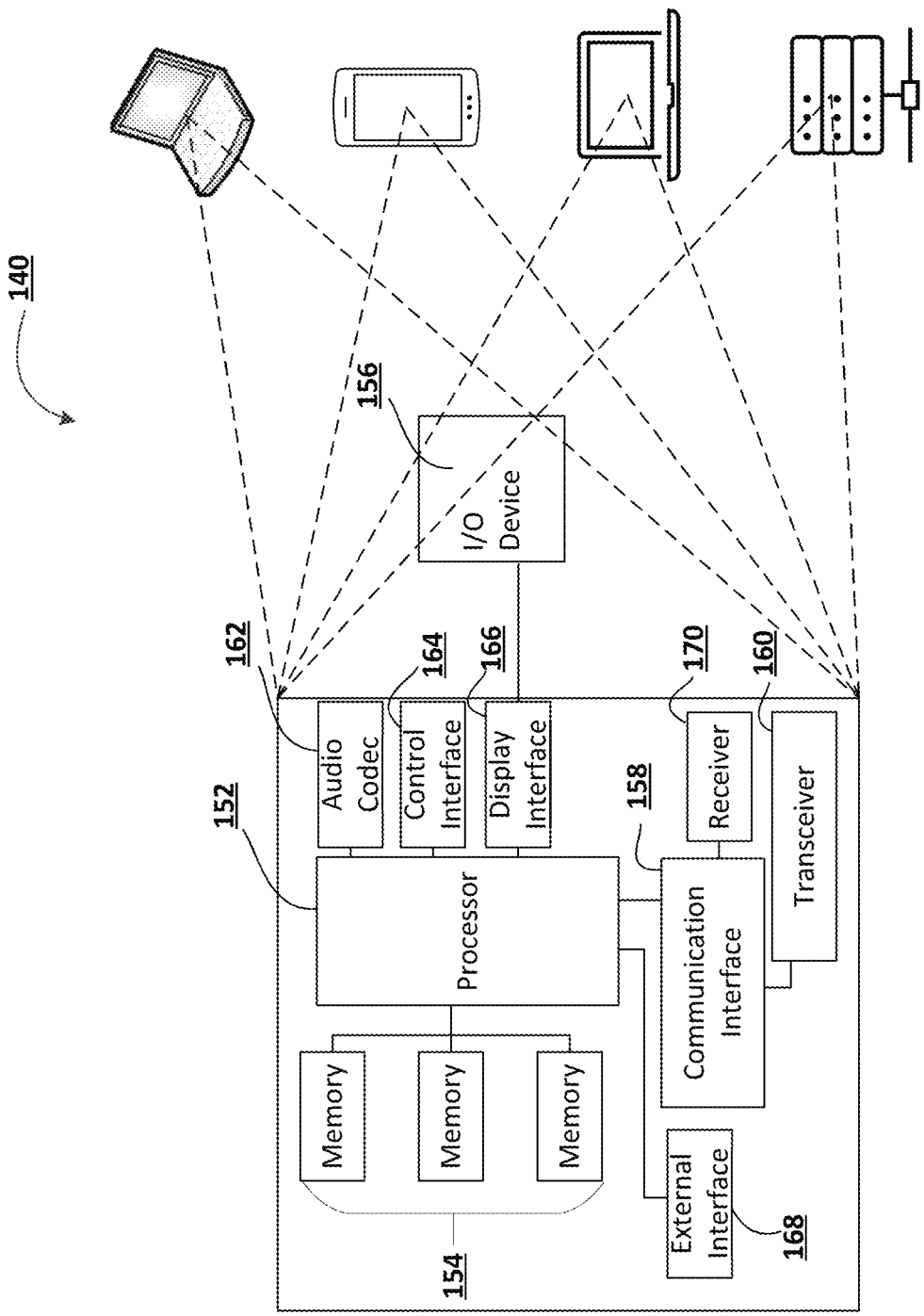

FIGS. 1A-1C illustrate technical components of an exemplary distributed computing environment for providing data analysis and processing using identification tagging of information on a graphical user interface, in accordance with an embodiment of the disclosure. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
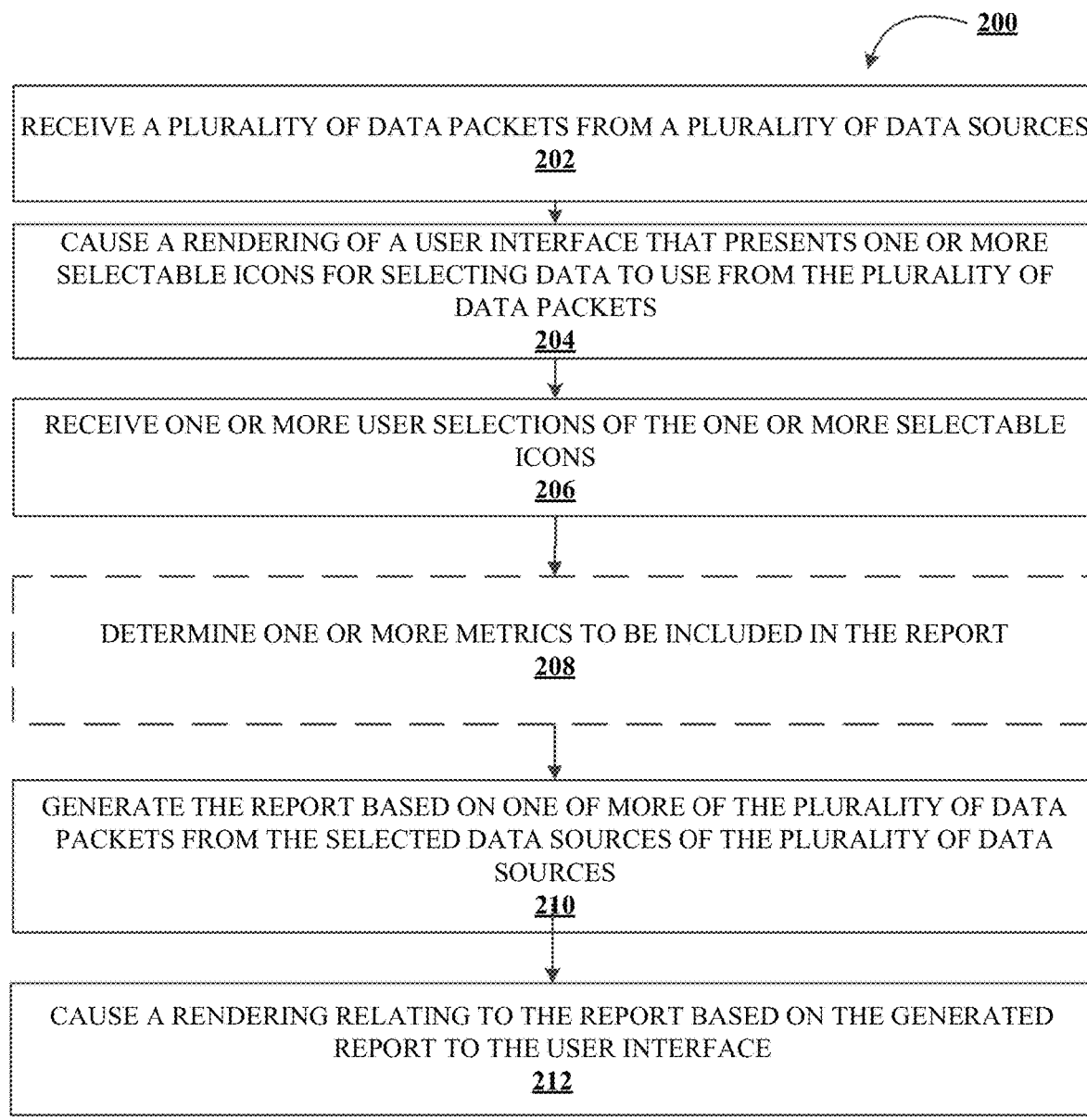
FIG. 2 illustrates a process flow for providing data analysis and processing using graphical user interface position mapping identification, in accordance with an embodiment of the present disclosure.

FIG. 2 is a flow chart 200 that illustrates another example method of providing data analysis and processing using graphical user interface position mapping identification. The method may be carried out by various components of the distributed computing environment 100 discussed herein (e.g., the system 130, one or more end-point devices 140, etc). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving a plurality of data packets from a plurality of data sources. The system is configured to communicate with multiple data sources, such as databases, data repositories, processors, memory, and/or the like. In some instances, the data sources may be controlled by various entities, such that the data readily combinable.

Each of the data packets contain data that can be parsed, searched, filtered, and/or the like. Each of the data packets may contain one or more data metrics associated with an entity. The data may have entity identification numbers or other identification labels used to identify the entity associated with the given data. In various embodiments, the data packets may include data associated with multiple entities. In such an instance, the system may be configured to identify portions of the data packet associated with a target entity. For example, the target entity may be a company and/or person for which data analysis is being performed, such that the system identifies any data associated with the target entity. In various embodiments, the system may receive information from a user identifying the target entity to be analyzed. For example, the system may provide a user with a graphical interface that allows the user to select the target entity. In various embodiments, multiple target entities may be selected (e.g., for a comparison of multiple people or companies).

Referring now to Block 204 of FIG. 2, the method includes causing a rendering of a user interface that presents one or more selectable icons for selecting data to use from the plurality of data packets. The selectable icons may each be associated with one of the plurality of data sources. The user interface may be engageable (e.g., clickable), such that the user can select one or more of the plurality of data sources to use in generation of the reports. The selectable icons may be in the form of a list (e.g., in which the user can select or unselect the given data sources). The user interface may include information associated with the data sources. For example, the information associated with the data sources may include data packet size and/or quantity, time of last update, and/or other various information about the data source.

Referring now to Block 206 of FIG. 2, the method includes receiving one or more user selections of the one or more selectable icons. The user can engage with the selectable icons to select the one or more of the plurality of data sources to use for a generation of a report. Between one and all of the data sources may be selected for use. The one or more user selections may be received via the user interface. The selected data sources may be used to produce the report discussed herein.

In various embodiments, the user interface may provide one or more recommendations to the user interface for one or more of the selectable icons. For example, the confidence level of one data source may be higher than another data source and the system may recommend using said data source.

Referring now to optional Block 208 of FIG. 2, the method includes determining one or more metrics to be included in the report. The metrics to be included in the report may be selected in various ways. In an example embodiment, the method includes determining one or more metrics to be included in the report based on the plurality of data packets from the selected data sources of the plurality of data sources. The selected data sources may include various metrics that can be used for the report (e.g., the system may use one or more metrics provided in each of the data packets). In various embodiments, the method includes determining one or more metrics to be included in the report based on one or more common metrics in the plurality of data packets from the selected data sources of the plurality of data sources.

In various embodiments, the method includes causing a rendering of one or more metrics to be used in the report and receive a metric selection from the user interface. In such an instance, the metric selection indicates the metrics to be used in the report. For example, the system may identify one or more metrics included in one or more selected data packets and the user interface may render said metrics for selection by the user. In such an instance, the at least one processing device is configured to receive one or more metrics to be included in the report from the user interface.

In various embodiments, the system is configured to determine one or more data fields in which the data packets contain. The data fields may be generated from headers in the data packets (e.g., the data packet may be a database that includes headers with the data field). Additionally or alternatively, the data fields may be determined based on the data format or other contents of the data packet.

Based on the data fields, the system is configured to render selectable icons on the graphical user interface to allow the user to select the data fields to be used. For example, the name, date, and value data fields may be present in a data packet and each of name, date, and value may be presented as a selectable icon, which allows the user to select the data field to be used in the reports. In various embodiments, the method also includes determining data of the plurality of data packets from the selected data sources of the plurality of data sources that is associated with the one or more metrics selected via the user interface.

Referring now to Block 210 of FIG. 2, the method includes generating the report based on one of more of the plurality of data packets from the selected data sources of the plurality of data sources. The report may include numerical representations and/or visual representations of the plurality of data packets from the selected data sources of the plurality of data sources. For example, the report may include graphical comparisons of various metrics relating to an entity (e.g., comparing metrics year over year). Additionally or alternatively, the information may be provided in spreadsheets and/or other charts. In some instances, the report may include both visual and numerical representations.

Referring now to Block 212 of FIG. 2, the method includes causing a rendering relating to the report based on the generated report to the user interface. In various embodiments, at least a portion of the generated report is rendered on the user interface. For example, a graph from the report may be rendered on the user interface. The report may be interactive (e.g., a user may manipulate charts and/or graphs on the user interface) For example, the user may be able to zoom into a graph and/or select to exclude portions of the data packets from analysis. In some instances, at least a portion of the rendered report may be static (e.g., the rendered portions of the report may be viewable, but not changeable.

The displayed data of the report is mapped via the system to a particular point to allow for consistent formatting, styling, commentary, and/or the like. For example, each cell of data is given a system identifier based on the location of the displayed data. The system identifier is based on the size and dimension of the given cell, instead of the value contents of the given cell. As such, the system identifier for a given cell can be referenced, such that as data in the report is updated and/or changed, the given cell remains in the same position without losing formatting, styling, commentary, and/or the like.

Figure 3:
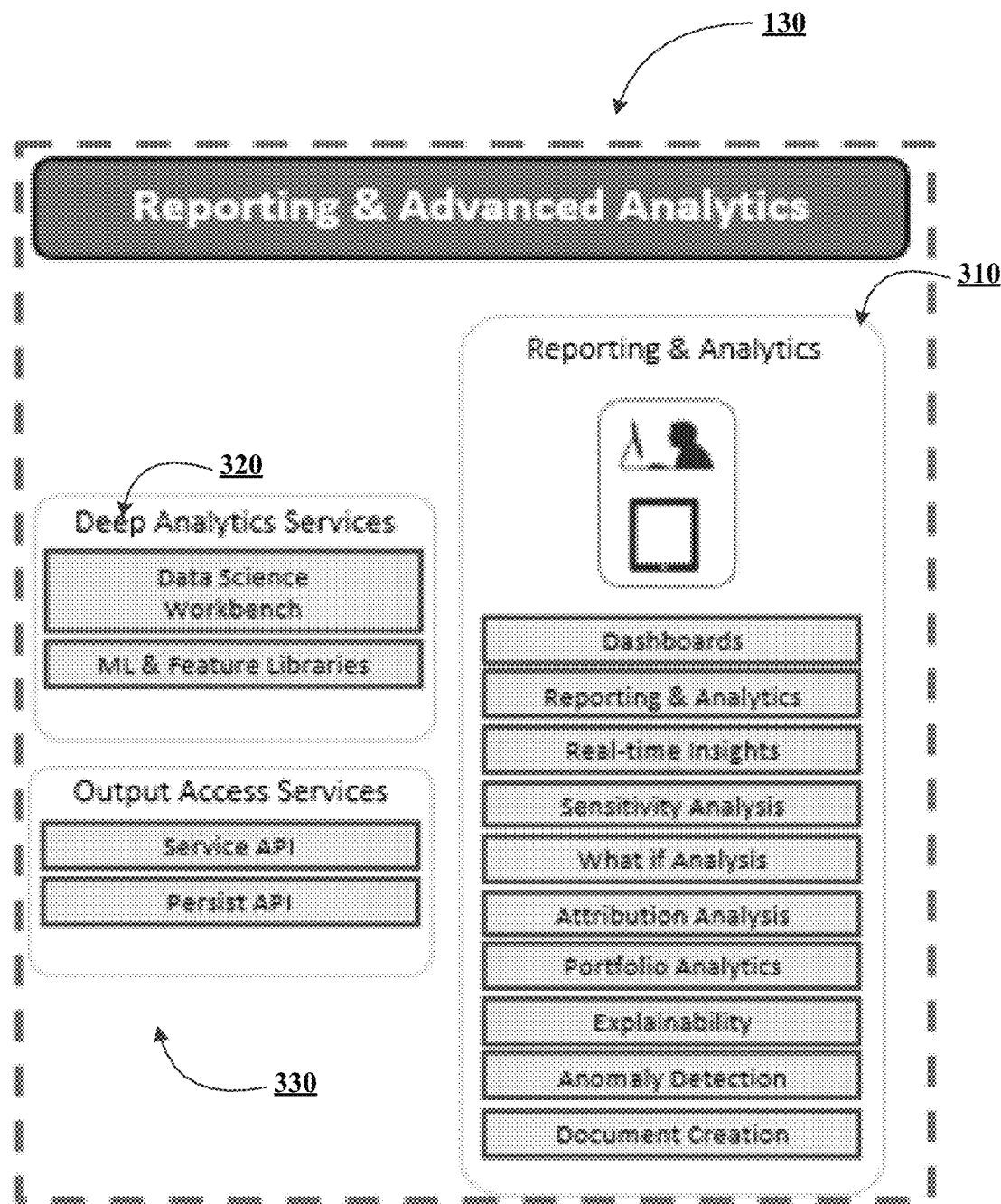
FIG. 3 illustrates technical components of an example system for providing data analysis and processing using identification tagging of information on a graphical user interface, in accordance with an embodiment of the present disclosure.

FIG. 3 illustrates another example structure of the system 130, in accordance with an embodiment of the disclosure. The components discussed in reference to FIG. 3 may be part or used in connection with the various components shown in FIG. 1B. For example, the reporting and analytics component 310, deep analytics services components 320, and/or the output access services components 330 may be carried out by the processor 102 shown in FIG. 1B. As shown, the reporting and analytics component 310 includes various types of analysis that are used to create the reports discussed in reference to FIG. 2 above and FIG. 4 below. For example, the reporting and analytics component 310 may generate the dashboards on which the reports are rendered. Additionally, the reporting and analytics component 310 may be capable of various reporting and analytic capabilities, such as real-time insights, sensitivity analysis, what if analysis, attribution analysis, portfolio analysis, explainability, anomaly detection, and/or document creation. The types of analysis listed is merely an example of analysis and report types.

Additionally, the system 130 may also use deep analytics services components 320. For example, the system may use machine learning and various other data science in order to process and analyze the data received. The system 130 may also include an output access services component 330 configured with a service API and/or a persist API, such that the reports can be rendered to a user interface.

Figure 4:
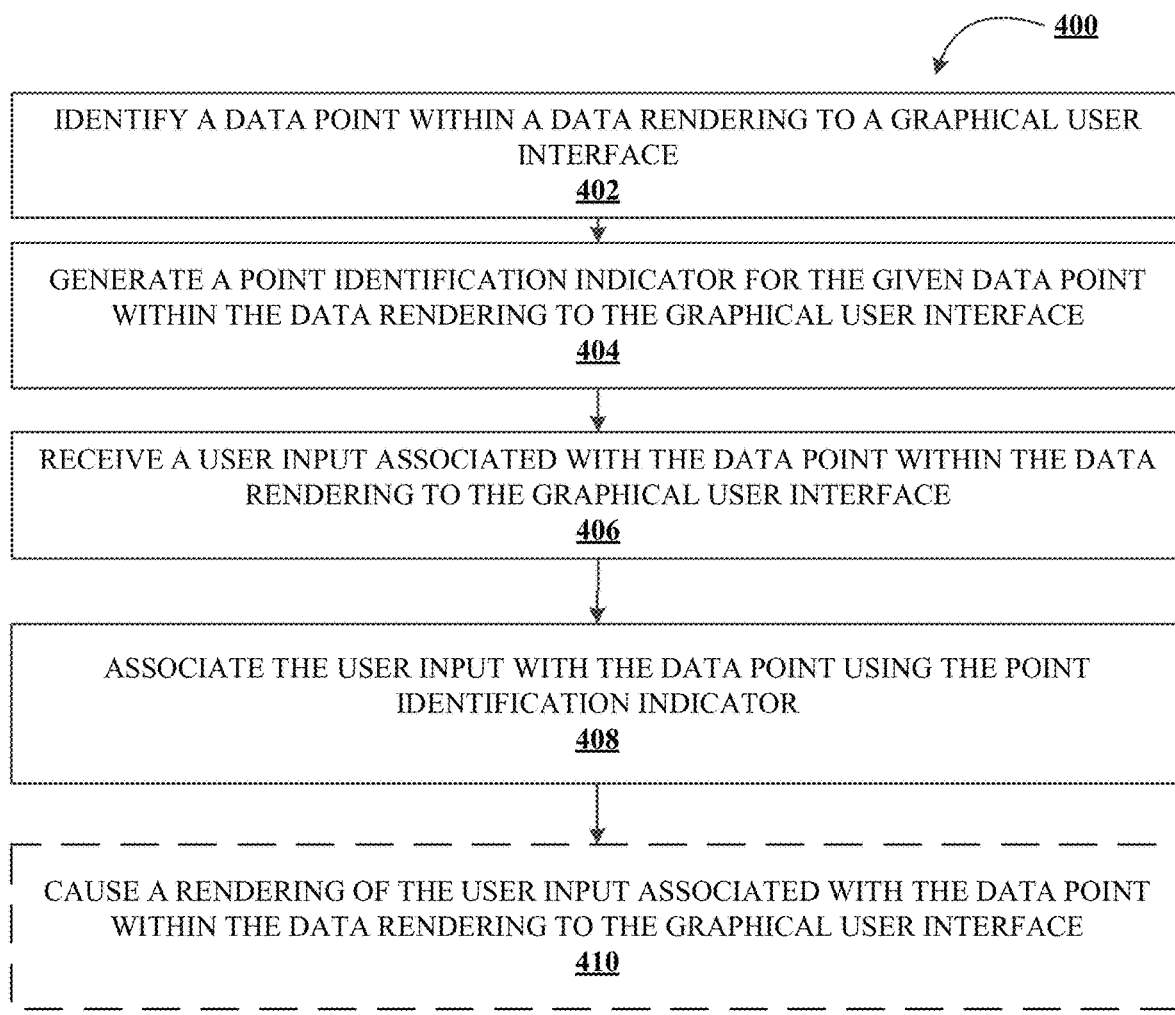
FIG. 4 illustrates a process flow for providing data analysis and processing using identification tagging of information on a graphical user interface, in accordance with an embodiment of the present disclosure.

FIG. 4 is a flow chart 400 that illustrates another example method of providing data analysis and processing using identification tagging of information on a graphical user interface. The method may be carried out by various components of the distributed computing environment 100 discussed herein (e.g., the system 130, one or more end-point devices 140, etc). An example system may include at least one non-transitory storage device and at least one processing device coupled to the at least one non-transitory storage device. In such an embodiment, the at least one processing device is configured to carry out the method discussed herein. FIG. 4 is an extension of FIG. 2 discussed above. Namely, FIG. 4 uses identification tagging in order to carry over commentary across different data points and locations in the graphical user interface. Unless otherwise noted, the features discussed above in reference to FIG. 2 can be used to carry out the operations of FIG. 4.

Referring now to Block 402 of FIG. 4, the method includes identifying a data point within a data rendering to a graphical user interface. The data point may be any field or data entry area within the data rendering. The data point may include a cell, row, column, and/or the like of a spreadsheet or chart. Additionally or alternatively, the data point may include various other identifiable sections of a user interface, such as a portion of a graph or the like.

The data point within the data rendering to the graphical user interface can be associated with one or more data packets from one or more data sources. For example, the data point may be a data type, data category, and/or the like. The data point may be a row or column of a spreadsheet that includes data from one or more of the data sources. In various embodiments, the data point may be associated with multiple data packets from different data sources (e.g., the system may compile data into a data point from multiple data sources).

In various embodiments, the data point may be represented in one or more portions of the user interface. For example, the data rendering of the user interface may have different portions, such as a graphical section, a spreadsheet section, a text section, and/or the like. In various embodiments, the data point may be represented across a plurality of the different portions of the data rendering. For example, the data point may be represented in numerical form in the spreadsheet portion of the data rendering and in graphical form in the graphical portion of the data rendering. In various embodiments, the data rendering may have different viewable pages showing the various portions or the various portions may be displayed on a singular page view. In various embodiments, the system may be configured to receive a user input to create a new portion of the data rendering (e.g., create a graphical section based on one or more data points on a spreadsheet portion).

Referring now to Block 404 of FIG. 4, the method includes generating a point identification indicator for the given data point within the data rendering to the graphical user interface. The point identification indicator is carried throughout the data rendering to each instance in which the data point is represented and rendered. As such, the point identification indicator is used to identify the data point across such representations. The point identification indicator is based on the location of the data within the data rendering, such that the point identification indicator can be used to maintain information, formatting, styling, and/or the like for the data point. The point identification indicator may be stored in a database or repository (e.g., memory 104) and used by the processor to process, analyse, and present the various data points in the reports as discussed herein.

Referring now to Block 406 of FIG. 4, the method includes receiving a user input associated with the data point within the data rendering to the graphical user interface. The user input is a user commentary associated with the data associated with the data point. The user input may be a textual input (e.g., a comment) or other information relating to the data point. For example, the user input may be a textual summary of the data point or a comparison of the data point to other data points (e.g., a user input may be "the revenue has increased by 5% since 2021"). The user input may be received by the system via the user interface or user input device in communication with the user interface (e.g., a keyboard). For example, the user may select a data point represented on the data rendering and provide a user input relating to the data point (e.g., a user may click on a row of a spreadsheet and input a user input). As discussed below in reference to Block 408, the user input is labelled or otherwise associated with the data point via the point identification indicator.

Referring now to Block 408 of FIG. 4, the method includes associating the user input with the data point using the point identification indicator. The user input is associated with the data point via the point identification indicator. As such, the point identification indicator allows the user input to be associated with the data point across various representations. The user input (e.g., a user commentary) can be displayed on the user interface in across different sections of the user interface. For example, the user input may be received at the spreadsheet section of a user interface but may also be displayed in the graphical section (e.g., as a comment on the graph). The user input may be stored with the point identification indicator, such that the user input may be retrievable via the point identification indicator.

Referring now to optional Block 410 of FIG. 4, the method includes causing a rendering of the user input associated with the data point within the data rendering to the graphical user interface. As discussed herein, the user input may be displayed in a representation of the data point. For example, the user input may be a cell within a column with the user input in a spreadsheet portion of the data rendering and/or the user input may be a text bubble relating to a portion of a graph that includes the data point. The data point and user input associated with the data point may be rendered in various ways via the user interface and the point identification indicator allows for the user input to be associated with the data point across each of these rendered methods.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing data analysis and processing using identification tagging of information on a graphical user interface, the system comprising:
at least one non-transitory storage device; and
at least one processing device coupled to the at least one non-transitory storage device, wherein the at least one processing device is configured to:
identify a data point within a data rendering to a graphical user interface;
generate a point identification indicator for the given data point within the data rendering to the graphical user interface, wherein the point identification indicator is used to identify the data point at any instance in which the data point is rendered to the graphical user interface;
receive a user input associated with the data point within the data rendering to the graphical user interface, wherein the user input comprises a user commentary associated with the data associated with the data point within the data rendering to the graphical user interface,
wherein the data point is used in various portions of the graphical user interface, wherein the point identification indicator is used to identify the data point at each of the various portions of the graphical user interface in which the data point is used, and wherein the user input is associated with the data point in each of the various portions of the graphical user interface; and
associate the user input with the data point using the point identification indicator, wherein the user input is associated with the data point within the data rendering to the graphical user interface via the point identification indicator.

2. The system of claim 1, wherein the at least one processing device is configured to cause a rendering of the user input associated with the data point within the data rendering to the graphical user interface.

3. The system of claim 1, wherein the user commentary relating to the data point is a textual input.

4. The system of claim 1, wherein the various portions of the graphical user interface comprise a first graphical section and a first spreadsheet section, wherein the user input is associated with the data point on each of the first graphical section and the first spreadsheet section.

5. The system of claim 1, wherein the data point within the data rendering to the graphical user interface is associated with a data packet from a data source.

6. The system of claim 1, wherein the data point within the data rendering to the graphical user interface is associated with at least two data packets from a plurality of data sources.

7. A computer program product for providing data analysis and processing using identification tagging of information on a graphical user interface, the computer program product comprising at least one non-transitory computer-readable medium having computer-readable program code portions embodied therein, the computer-readable program code portions comprising:
an executable portion configured to identify a data point within a data rendering to a graphical user interface;
an executable portion configured to generate a point identification indicator for the given data point within the data rendering to the graphical user interface, wherein the point identification indicator is used to identify the data point at any instance in which the data point is rendered to the graphical user interface;
an executable portion configured to receive a user input associated with the data point within the data rendering to the graphical user interface, wherein the user input comprises a user commentary associated with the data associated with the data point within the data rendering to the graphical user interface,
wherein the data point is used in various portions of the graphical user interface, wherein the point identification indicator is used to identify the data point at each of the various portions of the graphical user interface in which the data point is used, and wherein the user input is associated with the data point in each of the various portions of the graphical user interface; and
an executable portion configured to associate the user input with the data point using the point identification indicator, wherein the user input is associated with the data point within the data rendering to the graphical user interface via the point identification indicator.

8. The computer program product of claim 7, wherein the computer program product further comprises an executable portion configured to cause a rendering of the user input associated with the data point within the data rendering to the graphical user interface.

9. The computer program product of claim 7, wherein the user commentary relating to the data point is a textual input.

10. The computer program product of claim 7, wherein the various portions of the graphical user interface comprise a first graphical section and a first spreadsheet section, wherein the user input is associated with the data point on each of the first graphical section and the first spreadsheet section.

11. The computer program product of claim 7, wherein the data point within the data rendering to the graphical user interface is associated with a data packet from a data source.

12. The computer program product of claim 7, wherein the data point within the data rendering to the graphical user interface is associated with at least two data packets from a plurality of data sources.

13. A computer-implemented method for providing data analysis and processing using identification tagging of information on a graphical user interface, the method comprising:
identifying a data point within a data rendering to a graphical user interface;
generating a point identification indicator for the given data point within the data rendering to the graphical user interface, wherein the point identification indicator is used to identify the data point at any instance in which the data point is rendered to the graphical user interface;
receiving a user input associated with the data point within the data rendering to the graphical user interface, wherein the user input comprises a user commentary associated with the data associated with the data point within the data rendering to the graphical user interface,
wherein the data point is used in various portions of the graphical user interface, wherein the point identification indicator is used to identify the data point at each of the various portions of the graphical user interface in which the data point is used, and wherein the user input is associated with the data point in each of the various portions of the graphical user interface; and associating the user input with the data point using the point identification indicator, wherein the user input is associated with the data point within the data rendering to the graphical user interface via the point identification indicator.

14. The method of claim 13, further comprising causing a rendering of the user input associated with the data point within the data rendering to the graphical user interface.

15. The method of claim 13, wherein the various portions of the graphical user interface comprise a first graphical section and a first spreadsheet section, wherein the user input is associated with the data point on each of the first graphical section and the first spreadsheet section.

16. The method of claim 13, wherein the data point within the data rendering to the graphical user interface is associated with a data packet from a data source.

17. The method of claim 13, wherein the data point within the data rendering to the graphical user interface is associated with at least two data packets from a plurality of data sources.

18. The system of claim 1, wherein the user input is received in a first spreadsheet section of the graphical user interface and wherein the at least one processing device, upon execution of the instructions, is configured to render the user commentary is rendered on a first graphical section of the graphical user interface.

19. The computer program product of claim 7, wherein the user input is received in a first spreadsheet section of the graphical user interface and wherein the computer-readable program code portions comprising one or more executable portions are also configured to render the user commentary is rendered on a first graphical section of the graphical user interface.

20. The method of claim 13, wherein the user input is received in a first spreadsheet section of the graphical user interface, and wherein the method further comprises rendering the user commentary is rendered on a first graphical section of the graphical user interface.

\* \* \* \* \*